April 8, 1958
G. H. SKINNER ET AL
2,829,683
RIP SAW FEED
Filed Feb. 8, 1955
3 Sheets-Sheet 1
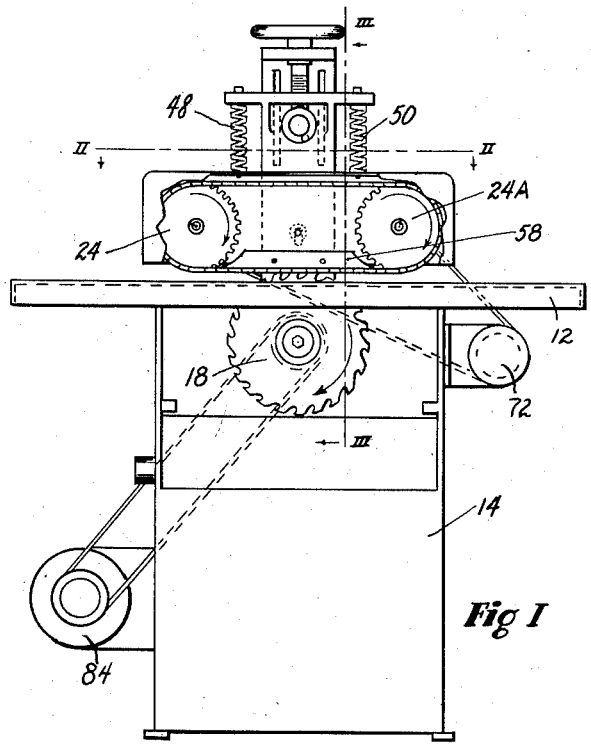
Fig I
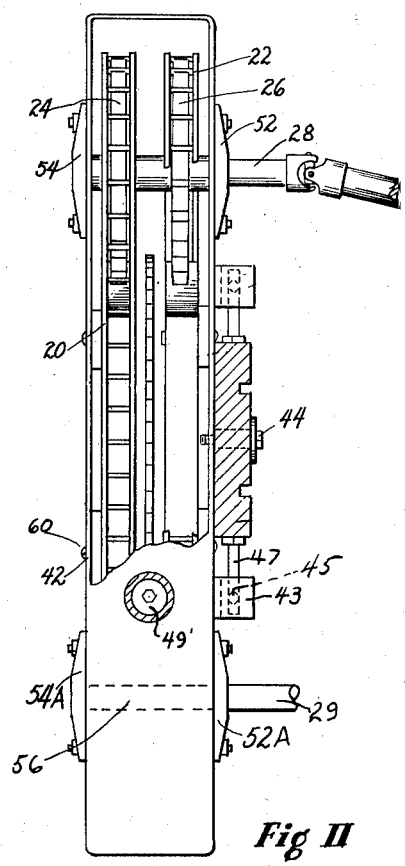
Fig II
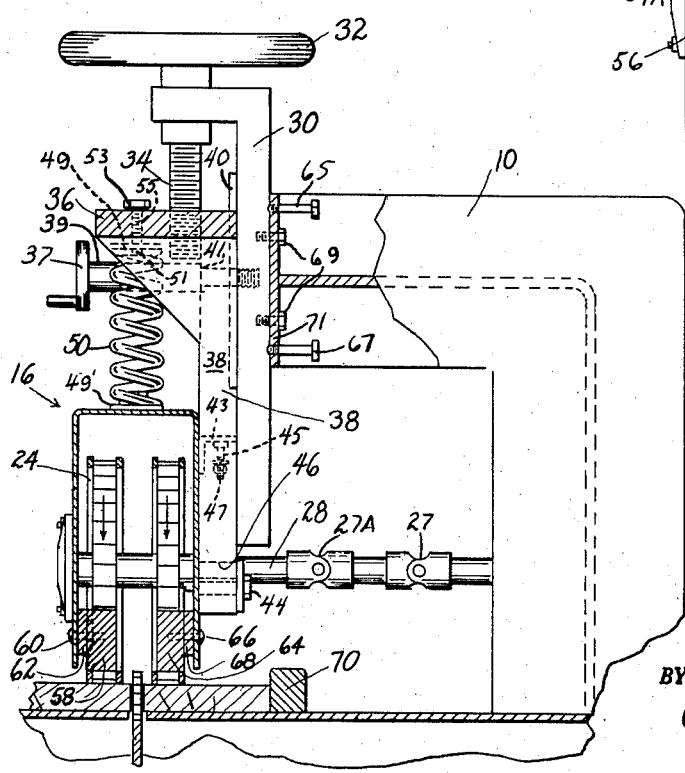
Fig III
INVENTOR.
GEORGE H. SKINNER
DONALD R. PROULX
BY Robert Wright
THEIR ATTORNEY April 8, 1958 G. H. SKINNER ET AL 2,829,683
RIP SAW FEED
Filed Feb. 8, 1955 3 Sheets-Sheet 2
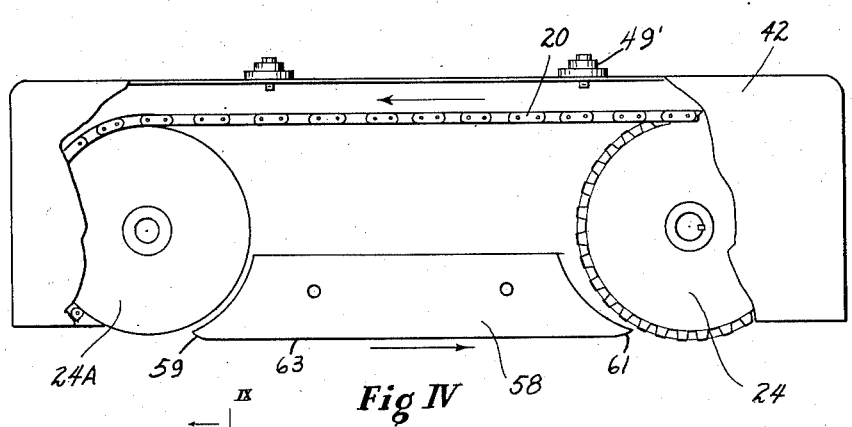
Fig IV
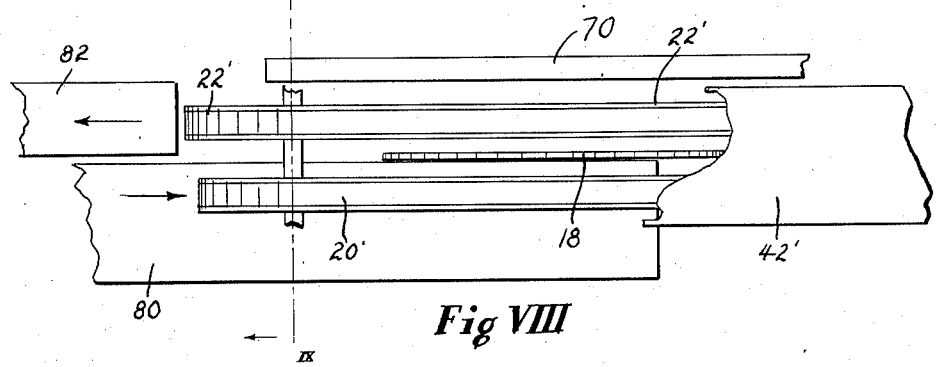
Fig VIII
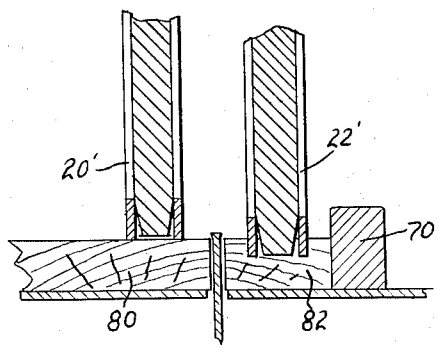
Fig IX
INVENTOR.
GEORGE H. SKINNER
BY DONALD R. PROULX
THEIR ATTORNEY

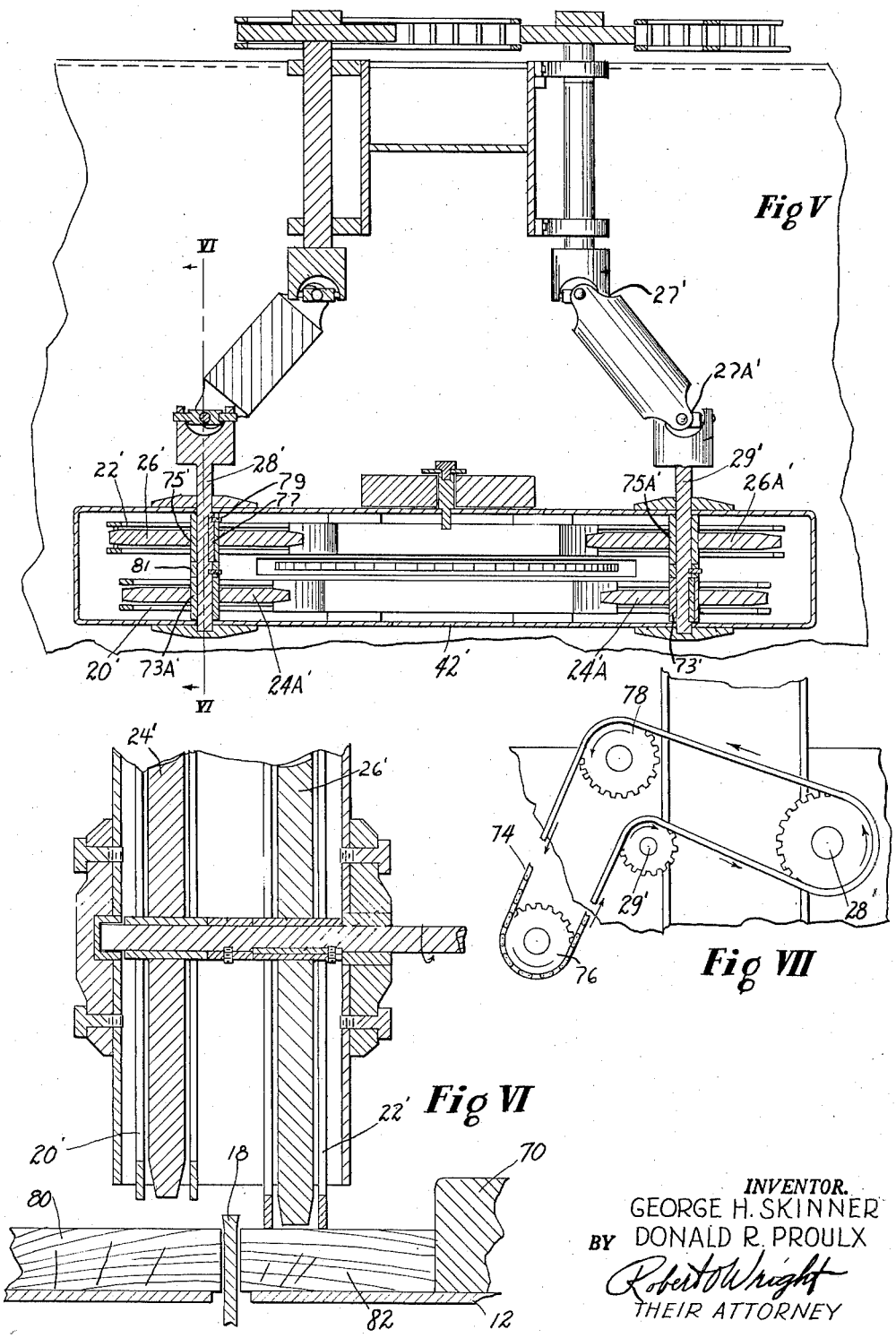

United States Patent Office 2,829,683
Patented Apr. 8, 1958

2,829,683

RIP SAW FEED

George H. Skinner, Deansboro, and Donald R. Proulx, Marcy, N. Y.

Application February 8, 1955, Serial No. 486,772

9 Claims. (Cl. 143—49)

This invention relates to work feeding devices and more particularly to a work feeding mechanism for use in connection with circular sawing machines, especially of the rip saw type.

Generally, in the woodworking field where a rip saw is provided with a feeding mechanism, it has heretofore comprised a series of rollers positioned in the saw table and rotated in a suitable manner and a presser foot or surface mounted above the saw table and adapted to urge a piece of wood into contact with the rollers in the saw table. The work piece is then fed to the rotated saw blade and cut as desired. This type of feed has been limited, to a single direction (forward), in the length of pieces that can be fed by the spacing and number of rollers, and to precision ground rollers and bearings to insure straight feeding for a straight rip cut.

According to the present invention, we have overcome these disadvantages and have provided an extremely simple, flexible and accurate mechanism for feeding work pieces to a rip saw. With the present invention, a piece of wood fed to a rip saw may be ripped straighter than heretofore, a work piece of any length may be ripped, and the remaining portion of a work piece after cutting may be returned to the operator if desired.

Accordingly, it is an object of the present invention to provide a feeding mechanism for circular saws that will assure greater accuracy in cutting a piece of wood or the like. It is another object of the present invention to provide a feeding mechanism that will handle any length of work piece. It is another object of the present invention to provide a feeding mechanism that will automatically return the work piece to the operator after a portion thereof has been severed from it. It is another object of the present invention to provide a feeding mechanism that may be used in conjunction with any standard circular saw by simple attachment thereto. It is another object of the present invention to provide an improved and simplified form of feeding mechanism that may be manufactured in an economical fashion. These and other and further objects will be in part apparent and in part pointed out as the specification proceeds.

In the drawings:

Figure 1 is a side elevation, partially broken away, of the present invention applied to a rip saw machine.

Figure 2 is a fragmentary top plan view, partially broken away, of the device of Figure 1.

Figure 3 is a fragmentary end view of the device of Figure 1.

Figure 4 is a fragmentary side elevation of the opposite side from Figure 1, partially broken away, of the feeding mechanism according to the present invention.

Figure 5 is a fragmentary top plan view of the feeding mechanism of another embodiment of the present invention.

Figure 6 is a sectional view on line 6—6 of Figure 5.

Figure 7 is a diagrammatic view showing the drive for the feeding mechanism of the embodiment of Figure 5.

Figure 8 (Sheet 2) is a top plan view of a portion of the feeding mechanism of Figure 5.

Figure 9 is a view on line IX—IX of Figure 8.

Referring now to Figures 1 and 2, the present invention comprises generally a frame member 10 carrying thereon a feeding mechanism 16, member 10 being adapted to be mounted on a rip saw 14, so that the feeding mechanism 16 will overlie the saw blade 18 of the saw 14. Feeding mechanism 16 is yieldably mounted on the end of frame member 10 and comprises generally a pair of endless chains or belts 20 and 22 mounted about sprockets or wheels 24—24A and 26—26A. Sprockets 24 and 26 are fixed to shaft 28 which is driven through universal joints 27 and 27A by a belt or chain (not shown) about sprocket 31.

Frame member 10 carries on its end an inverted L shaped bracket 30 (Figure 3) which carries an adjusting hand wheel 32 in the foot portion thereof. Shaft 34 of hand wheel 32 is threaded to engage a threaded hole in flange 36 of slide member 38, which is adapted to be slideably mounted on bracket 30 on tracks 40 or other suitable means. Slide member 38 may be locked to bracket 30 by hand wheel 37 which is carried on the end of shaft 39. Shaft 39 is threaded on the end and engages a threaded hole in bracket 30. A shoulder 41 on shaft 39 locks slide member 38 against bracket 30. Casing 42 (Figure 2) of drive mechanism 16 is mounted on slide member 38 by bolt 44 which rides in vertical slot 46 adjacent the lower edge of member 38. Housing 42 is also connected to flange 36 through compression springs 48 and 50 (Figures 1 and 3) which urge housing 42 in the downward direction until stopped by bolt 44 contacting the bottom of slot 46, as shown in Figure 3.

Housing 42 also has mounted thereon guiding flanges 43 (see Figure 2) which engage and rest on bolts 45 mounted in rods 47 on slide member 38. These flanges and bolts act to stabilize housing 42 relative to the saw table after a work piece has been fed therethrough so that it will not remain in a tilted position and jam as the next piece is fed to the machine. The tension of springs 48 and 50 may also be adjusted through the upper mounting means which comprises stepped caps 49 each having a hole 51 in the center thereof into which fits a set screw 53 which extends through a threaded hole 55 in slide member 38. A similar cap 49' (Fig. 4) is bolted in housing 42 to provide a secure mounting for the bottoms of springs 48 and 50.

Sprockets 24 and 26 are mounted within housing 42 on shaft 28 which is journalled in any suitable bearings 52 and 54 mounted on housing 42. Sprockets 24A and 26A which act as driven wheels are mounted on shaft 29 in bearings 52A and 54A at the other end of housing 42. Feed chains 20 and 22 are mounted about wheels 24—24A and 26—26A to form an endless feeding belt assembly that extends a substantial distance ahead of and behind the saw blade 18 as may be clearly seen in Figure 1. Also, chains 20 and 22 are spaced apart a distance sufficient to readily permit saw blade 18 to be inserted therebetween.

Between sprockets 24 and 24A there is mounted adjacent the lower side of chain 20, a chain supporting shoe 58, which, as may be seen in Figure 3, is fixed to the outer side of housing 42 by bolts 60 and spacer 62. In a similar manner shoe 64 is provided for chain 22 and is mounted on the inner side of housing 42 by bolts 66 and spacer 68.

While, as shown in Figures 1 through 3, chains 20 and 22 are of the conventional link type mounted about conventional type sprockets 24—24A and 26—26A, other conveyor means could be used, such as endless V belts and pulleys, with equal facility. As used herein, the terms "belt" and "wheel," include the above and similar types of conveyor mechanisms.

Referring now to Figure 4 there is shown one form of sprocket, chain and supporting shoe that has been found particularly advantageous. Assuming that the feed is to be in the direction of the arrow, wheel 24 is a conventional sprocket wheel of approximately five inches in diameter. Wheel 24A is a plane disc of metal of the same thickness as wheel 24 and a diameter equal to the root diameter of wheel 24. Shoe 58 is of the same thickness as wheel 24A and is flat along its lower edge for substantially its entire length. Leading edge 59 curves upwardly slightly and fits closely about a portion of wheel 24A. Trailing edge 61 curves upwardly somewhat less than edge 59. The flat surface 63 is positioned about 1/8 inch below the root circumference of wheel 24.

Chain 20 rides smoothly along shoe 58, wheel 24A and over sprocket wheel 24. This, it has been found, produces an exceptionally smooth efficient feed without excessive vibration that can be accurately controlled and which will positively pick up the work piece without tipping it. This is particularly so in thick short pieces of wood or other material.

For certain applications, however, it has been found desirable to use sprocket wheels at both ends. Thus, in Figure 5, both wheels 24' and 24A' are sprocket wheels. Here shoe 58' cannot fit quite as closely about wheel 24A' but the overall shape and position is unchanged.

Chains 20 and 22 are of the conventional link type but have a notch cut in the side frame of each link to provide a positive engaging edge to pick up and carry the work piece. In some finishing operations this form of chain may mar the surface too much so that it is sometimes desirable to fix rubber or similar composition cleats to a chain or belt to provide a positive non-marring grip. Chains and belts of this general type are well known in the art and are not per se a part of the present invention and are not shown for the sake of clarity.

Prior to operation on any given saw the feed belts 20 and 22 of feeding mechanism 16 must be accurately aligned relative to the saw blade. In Figures 1–4 two pairs of aligning set screws 65 and 67 and a pair of bolts 69 in the face 71 of frame member 10 are provided. As may be seen in Figure 3 bracket 30 is fixed to face 71 of frame 10 by bolts 69. Normally, bracket 30 would fit flush against face 71 but to insure proper alignment of the feed belts, bracket 30 may be moved out of a plane parallel to face 71. The pair of set screws 65 are threaded in face 71 on either side of upper bolt 69 and set screws 67 are similarly positioned about lower bolt 69. Thus, by adjusting bolts 69 and set screws 65 and 67, bracket 30 may be accurately aligned with saw blade 18. Since slide member 38 is fixed to bracket 30 and housing 42 in turn rests on the surface of member 38, housing 42 and belts 20 and 22 mounted therein may be accurately aligned with saw blade 18.

For normal operation belts 20 and 22 are aligned exactly parallel with saw blade 18. Rip fence 70 is normally "opened" very slightly to prevent binding of the work piece between it and saw blade 18. Thus belts 20 and 22 actually carry the work piece relative to saw blade 18 and determine the accuracy of the cut.

Since belts 20 and 22 are driven by wheels 24 and 26 they are in tension and can pull only in a straight line along the surface of the work piece. Thus, since the line of belts 20 and 22 is accurately aligned with saw blade 18, a work piece fed to mechanism 16 is cut extremely accurately regardless of variations in thickness, warp, etc. all without the necessity of expensive accurately machined parts. All problems of non-uniform rollers, bearings, wheels, etc. of the conventional feeds are eliminated. In addition, since the feeding mechanism 16 provides a continuous area of contact from well before to well beyond saw blade 18, very small lengths of wood may be cut with the same accuracy as with larger pieces unlike the conventional feed mechanisms heretofore known.

The alignment of wheels 24'—24A' and 26'—26A' is accomplished by the use of sleeves and bushings on shafts 28 and 29 within housing 42'. The details of mounting of the sleeves and bushings on shafts 28 and 29 are shown only for the sake of simplicity in Figures 5 and 6 as applied to the embodiment therein. It should be noted however that the same bearing and sleeves are used in the embodiment of Figure 2, the only difference being the change in the idler and driven sprockets on the outer pair. Corresponding numbers have been used in Figure 5 as would be used in Figure 2 if the details were shown. Thus, driven wheels 24A' and 26' are mounted on bushings 73' and 75' which are keyed to shafts 28' and 29' by keys 77 and fixed thereon by set screws 79. A collar 81 is fixed to shaft 28 between wheels 24' and 26'. Idler wheels 24' and 26A' are mounted on corresponding bushings 73A' and 75A' on shaft 29 but are not fixed thereto. A collar similar to 81 is fixed to shaft 29 between wheels 24A' and 26A' to maintain proper alignment thereof.

In operation, the hand wheel 32 is adjusted so that the belts 20 and 22, on their lower side, are spaced from table top 12, a distance somewhat less than the thickness of the wood or other work piece to be fed to the saw and hand wheel 37 is then tightened to fix member 38 to bracket 30. The rip fence 70 is then adjusted for teh desired distance from the saw blade 18 on table 12 and the piece of wood placed on the table 12 and fed toward the mechanism 16 (from the right in Figure 1) until engaged by the belts 20 and 22. The entrie feeding mechanism 16 will adjust upwardly within the limits of slot 46 as the belts 20 and 22 pick up the piece of wood and feed it past saw blade 18 until it is discharged at the other end (left end of Figure 1).

Saw blade 18 is driven by motor 84 and shaft 28 is advantageously driven from a separate motor 72. This permits accurate regulation of the rate of feed completely independently of the operation of the saw blade so that it will not vary with the load imposed on the saw blade motor and also permits independently adjustable rates of feed. For instance, a constant normal forward feeding rate of 65 feet per minute to 120 feet per minute may be provided by a simple change of gears on shaft 28. Advantageously, a multiple gear with a chain tensioning device (not shown) may be provided to permit quick change from one speed to another.

Referring now to Figure 5, there is shown a second embodiment of the present invention wherein the outer feeding belt 20' is somewhat smaller than the inner feeding belt 22'. This may be accomplished in any of several different ways as by making the belts of different thicknesses, using cleats of different thicknesses, using supporting wheels of different diameters, and so forth. In the embodiments shown sprockets 24' and 24A' are from 1/2 inch to 1 inch smaller in diameter than sprockets 26' and 26A'. In addition, sprocket 24' is an idler sprocket and sprocket 24A' is driven in a direction opposite to that of sprocket 26'. Sprocket 26' is fixed to drive shaft 28' which is driven in the same direction as shaft 28 in Figure 1. Sprocket 24' is loosely journaled on shaft 28' for rotation independent thereof. Conversely, at the other end of housing 42', sprocket 24A' is fixed to shaft 29' and sprocket 26A' is loosely journaled on shaft 29' for rotation independent thereof. Shaft 29' is driven through a pair of universal joints 27' and 27A' similar to those of shaft 28 as will be described herein.

Shafts 28' and 29' are driven in opposite directions by a drive system as shown in Figure 7. The drive system of Figure 7 comprises a motor 72 (see Figure 1) mounted on the base portion 14 and a chain 74 going from a sprocket 76 on the shaft of the motor 72, around a sprocket on shaft 29', around a sprocket on the shaft 28', about an idler sprocket 78 which may incorporate a chain tensioner device, and back to the motor 72. As may be seen in Figure 7, the direction of drive of shafts 28' and 29' are reversed and the drive wheel on shaft 29' is smaller than the drive wheel on shaft 28'. Thus, outer feed belt 20' will be driven in the opposite direction from inner feed belt 22' and at a somewhat greater rate of speed. This greater speed for belt 20' has been found desirable to speed the return of the work piece so as to minimize lost time and yet allow the work piece being sent back to the operator to be conveniently and safely handled. A typical return rate of 150 feet per minute has been found satisfactory for work pieces having a maximum length of about four feet.

Referring now to Figure 6, there is shown an enlarged detailed view of work piece 80 being fed through the mechanism of Figure 5. As may be seen, the work piece 80 is initially guided by rip fence 70 and is engaged by inner feed belt 22' which is drawing work piece 80 in the forward direction away from the viewer in Figure 6. Work piece 80 is engaged by belt 22' from approximately shaft 28' to shaft 29' which is a substantial distance on either side of saw blade 18. For instance, with a 10" saw blade a spacing between shafts 28' and 29' of 17 inches has been found satisfactory. This provides a firm continuous engagement which insures accurate feeding of the work piece until it has passed beyond the left end of belt 22' in Figure 8. At this point, work piece 82 will have been severed from the original work piece 80 and will have passed out from underneath belt 22' and wheel 26'. Housing 42' will then be caused to fall downwardly under the influence of springs 48 and 50 until belt 20' contacts the remaining portion of work piece 80 which, since it was not in contact with feed belt 22', was not fed any further forward once piece 82 was severed therefrom by saw blade 18. Thus, the rear edge of work piece 80 will remain adjacent the leading edge of saw blade 18 (see Figure 8) until work piece 82 is fed from under feed belt 22', and housing 42' descends to the position of Figure 9. At this point, belt 20' engages work piece 80 and since it is rotated in a direction opposite to that of belt 22' work piece 80 is returned to the operator standing at the right of Figure 1.

Again, since wheel 24A' is the driven wheel, belt 20' is in tension and causes work piece 80 to be returned in the exact line of belt 20', so that it does not hit saw blade 18 or otherwise stray from the desired return path. Advantageously, this return path is led away from saw blade 18 to prevent any possible undesired binding or cutting of the work piece. This is accomplished by making bushing 73' a few thousandths smaller than bushing 73A' and fixing bushing 73' to shaft 29' with it just touching the outer wall of housing 42'. This very slight outward slant of chain 20' is sufficient to lead the work piece away from blade 18. The entire sequence may then be repeated after work piece 80 has cleared belt 20' by moving it over against rip fence 70 and into engagement with feed belt 22' again.

In any operation such as the foregoing, it is believed clear that housing 42' is adjusted relative to table 12 so that the bottom of slot 46 is sufficiently close to table top 12, so that feed belt 20' may properly contact work piece 80 after piece 82 has passed from under belt 22' (see Figure 9).

There is thus provided an extremely accurate feeding mechanism which will automatically return the unused portion of the work piece to the operator for further handling, all in accordance with the foregoing objects.

While there is given above a certain specific example of this invention and its application in practical use, it should be understood that this is not intended to be exhaustive or to be limiting of the invention. On the contrary, this illustration and explanation herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

We claim:

1. A saw feeding mechanism for automatically feeding a work piece past a saw blade of a rip saw machine and the like which comprises a smooth continuous work table surface having therein a slot adapted to receive therethrough said saw blade, a frame member adapted to be mounted on said saw machine and extend to a point adjacent said saw blade, a slide member adapted to be movably mounted on said frame member, screw means for adjustably positioning said slide member on said frame member, locking means for fixing said slide member to said frame member, a vertical slot in said slide member adjacent the bottom edge thereof, an elongated housing member, bolt means for slidably fastening said housing to said slide member through said slot, a pair of springs mounted between said slide member and housing to urge said housing toward the bottom of said slot, a pair of sprocket wheels mounted in one end of said housing, said wheels being spaced apart a distance greater than the width of a saw blade, a pair of follower wheels mounted in the other end of said housing, said follower wheels being spaced apart a distance corresponding to said sprocket wheel spacing, a pair of endless feeding chains mounted about said sprocket and follower wheels, a chain supporting shoe mounted on said housing between each cooperating pair of sprocket and follower wheels, alignment means for aligning said feeding chains relative to said saw blade and means for rotating said sprocket wheels so that the portion of said feeding chains adapted to contact a work piece fed to the saw is in tension whereby an extremely accurate straight line feed is obtained.

2. A saw feeding mechanism for automatically feeding a work piece past a saw blade of a rip saw machine and the like which comprises a frame member adapted to be mounted on said saw machine, a slide member adapted to be movably mounted on said frame member, means for adjustably mounting said slide member relative to said saw blade, an elongated housing open on the bottom, means for yieldably mounting said housing on said slide member with the open bottom adjacent the saw blade, a first pair of feed wheels mounted adjacent one side of said housing with one wheel of said pair in each end thereof, a second pair of feed wheels mounted adjacent the other side of said housing with one wheel of said pair in each end thereof, said second pair of feed wheels having a smaller diameter than said first pair, means for driving said first pair of wheels in a forward direction, and means for driving said second pair of wheels in the opposite direction whereby a work piece fed to said mechanism will automatically be fed to the saw blade by said first pair until a piece is cut off therefrom and then be returned to the place of beginning for further operation by said second pair.

3. A saw feeding mechanism for automatically feeding a work piece past a saw blade of a rip saw machine and the like which comprises a frame member adapted to be mounted on said saw machine, a slide member adapted to be yieldably mounted on said frame member, screw and lock means for selectively moving said slide member toward and away from the saw blade, a rectangular housing having an open bottom slidably mounted on said slide member for movement toward and away from the saw blade independently of said slide member, at least one spring mounted between said slide member and housing urging said housing toward the saw blade, stabilizer means on said housing for returning said housing substantially to a predetermined position after movement therefrom during operation, a first pair of wheels mounted in opposite ends of said housing adjacent one side thereof, a second pair of wheels correspondingly mounted adjacent the other side of said housing, said second pair of wheels having a diameter less than said first pair, means for aligning said pairs of wheels in a plane substantially parallel to the plane of the saw blade, means for driving said first pair of wheels in a forward direction and means for driving said second pair of wheels in the opposite direction.

4. In a machine for sawing small pieces of lumber and the like from larger pieces of the type having a saw table adapted to support work pieces relative to a saw blade extending through a saw receiving slot therein, a work feeding mechanism comprising a pair of work feeding belts adjustably and yieldably mounted above the saw table, said belts extending a substantial distance beyond both edges of the saw blade in a direction parallel thereto and being spaced apart a distance sufficient to permit the saw blade to extend upwardly therebetween, two pairs of supporting wheels mounted above the saw table to transport thereon said feeding belts, motor drive means for rotating at least one wheel of each of said pairs, one of said pairs of wheels being smaller in diameter than the other and being driven in the opposite direction to the other whereby one of said belts moves in a forward feeding direction and other in a reverse feeding direction to provide an automatic work piece feed and return.

5. In a rip saw machine of the type having a saw blade extending through a work table surface adapted to rip relatively narrow strips from larger pieces of wood, plastic and the like, a work piece feeding mechanism comprising a smooth fixed work supporting surface mounted about the saw blade, two parallel endless feeding belts yieldably mounted in cooperative relationship to an adjacent said saw blade supporting surface, supporting means for said feeding belts including driving means for rotating said belts past said supporting surface, one of said belts being somewhat smaller than the other and driven in opposite direction thereto whereby a work piece placed in said device will be positively carried past the saw blade in a predetermined relationship thereto and have a portion thereof severed from the remainder as it is carried past said saw blade and the remaining portion will be returned to the place of beginning after the severed portion has been discharged.

6. In a rip saw woodworking machine of the type having a saw table with a saw blade mounted to project therethrough and a rip fence mounted thereon; a work piece feeding mechanism comprising a frame member adapted to be mounted on said machine so as to extend over the saw table top; a mounting bracket having a slot therein adjustably mounted on said frame so as to extend over said saw blade; a housing member, open on the bottom, slideably mounted in said slot; spring means urging said housing toward the top of said saw table; two pairs of spaced supporting wheels mounted in said housing so as to permit entry of the saw blade therebetween; an endless work feeding belt positioned about each of said pairs of wheels with one side of each belt extending below said housing; one of said work feeding belts being smaller in diameter than the other and driven in opposite direction to the other; a pair of belt supporting shoes mounted in said housing adjacent the inner surfaces of the sides of said belts extending below said housing to form work engaging surfaces of substantial length adjacent each side of the saw blade; and means for driving one wheel of each of said pairs to move said belts about said wheels whereby a work piece placed between said housing and table top is carried past said saw blade in one direction until a portion is cut off by said saw blade and removed from adjacent said blade and then the remainder fed in the reverse direction back to the point of origin.

7. A device as described in claim 6 wherein the pair of supporting wheels adjacent the rip fence are larger in diameter than the other pair and are driven in a forward direction and the other pair is driven in a reverse direction whereby as long as a work piece is in position between the saw blade and rip fence it is fed in the forward direction and as soon as it leaves said position the smaller pair of supporting wheels drop down onto the remainder of said work piece and feed it in a reverse direction back to the place of beginning.

8. In a rip saw woodworking machine of the type having a saw table, a saw blade mounted to project therethrough and a rip fence adjacent the blade, a work piece feeding mechanism comprising a frame member adapted to be mounted on the saw table and extend over the top thereof, a housing member open on the bottom, resilient mounting means for fastening said housing on said frame member and urging it toward the top of the saw table, two pairs of spaced supporting wheels mounted in said housing so as to permit entry of the saw blade between said pairs, a pair of endless work feeding belts positioned about said supporting wheels with one side of each belt extending below said housing to form work engaging surfaces of substantial length adjacent each side of the saw blade, one of said pair of endless belts having a smaller effective diameter than the other, and means for driving one wheel of each of said pairs of supporting wheels in opposite directions to move said belts about said wheels whereby a work piece fed to said device is first fed in one direction until a portion is cut off by and removed from adjacent the saw blade and then the remainder is fed in the reverse direction back to the point of origin.

9. In a machine for sawing small pieces of lumber, plastic and the like from larger pieces of the type having a saw table adapted to support work pieces relative to a saw blade mounted in cooperative relationship thereto, a work feeding mechanism comprising a pair of work feeding belts mounted above the saw table in a direction parallel to the saw blade and spaced apart a distance sufficient to permit the saw blade to enter therebetween, drive means for rotating said belts in opposite directions, one of said work feeding belts having its lower edge positioned closer to said saw table than the other whereby work pieces fed to said mechanism will be fed past the saw block by said one belt until a portion is severed therefrom and the remainder will then be returned to the place of beginning by said other belt.

References Cited in the file of this patent

UNITED STATES PATENTS

| | | |
|---|---|---|
| 877,124 | Robinson et al. | Jan. 21, 1908 |
| 1,109,747 | Giertsen | Sept. 8, 1914 |
| 1,487,649 | Foreman | Mar. 18, 1924 |
| 1,529,806 | Oettel | Mar. 17, 1925 |
| 1,661,767 | Loetscher | Mar. 6, 1928 |
| 1,803,857 | Lumb | May 5, 1931 |
| 2,117,641 | Westlund | May 17, 1938 |
| 2,332,888 | Bostwicj et al. | Oct. 26, 1943 |
| 2,593,745 | Gillespie | Apr. 22, 1952 |
| 2,615,483 | King | Oct. 28, 1952 |
| 2,646,088 | Smith | July 21, 1953 |
| 2,664,123 | Arvidson | Dec. 29, 1953 |
| 2,687,153 | Moore | Aug. 24, 1954 |